Patented Nov. 28, 1950

2,531,409

UNITED STATES PATENT OFFICE 2,531,409

INTERPOLYMERS OF ACRYLONITRILE AND FUMARODINITRILE

Gaetano F. D'Alelio, Shaker Heights, Ohio, assignor to Industrial Rayon Corporation, Cleveland, Ohio, a corporation of Delaware No Drawing. Application December 13, 1946, Serial No. 716,169

10 Claims. (Cl. 260—78.5)

This invention relates to copolymers of acrylonitrile and fumaronitrile. More particularly this invention is concerned with molecularly oriented formed structures comprising the cold drawn polymerization product of a polymerizable mass comprising acrylonitrile and fumaronitrile in the presence or absence of other monoethylenic copolymerizable monomers. This invention also deals with compositions of these copolymers adapted to the formation of shaped articles and with processes for the conversion of these compositions to molecularly oriented fibers, threads, bristles, monofilaments, hereinafter referred to as "fibers," and other shaped articles, such as films and the like.

Generally, it has been known for some time that certain copolymers of acrylonitrile may be adapted to the preparation of shaped articles, such as films, fibers, foils, tubes, etc. However, only some of these copolymers have been regarded as capable of being cold drawn to produce structures molecularly oriented along the fiber axis. Cold drawing may be defined as the stretching of a polymeric material at a temperature below the melting point of the material to give a molecularly oriented structure.

In general, copolymers of acrylonitrile having high percentages of acrylonitrile in the polymer molecules, e. g. about 85 percent or more, have been regarded as desirable for the preparation of molecularly oriented structures. For some time the use of these copolymers was limited by the lack of information on suitable solvents. Recently however, more appropriate solvents, such as N,N-dimethyl acetamide, have been suggested for use in preparing compositions of copolymers containing at least about 85 percent acrylonitrile in the polymer molecule.

The use of effective solvents has made possible the preparation of molecularly oriented structures from certain copolymers containing at least about 85 percent acrylonitrile. Heretofore it has been believed that such copolymers may be more readily adapted to the preparation of molecularly oriented structures than either an unmodified polyacrylonitrile or a copolymer of acrylonitrile containing less than about 85 percent acrylonitrile.

It has now been found possible to prepare molecularly oriented shaped articles from cold drawn copolymers of acrylonitrile and fumaronitrile. Such articles may be produced in accordance with this invention by dissolving the copolymer in a suitable solvent, coagulating the desired polymer into the shaped article and thereafter subjecting the article to such further treatment, e. g., cold drawing, heat treating, etc., as may be necessary to give the article the desired properties.

The term "fumaronitrile" is used in this specification in its ordinary sense in that it is restricted to fumarodinitrile and is not intended to include any mononitriles.

The polymer molecules of the acrylonitrile-fumaronitrile copolymers of this invention should contain at least about 40 percent by weight of acrylonitrile, at least about 1 percent fumaronitrile and the percent of other copolymerizable compounds may vary from $$0 \text{ to } \frac{115-X}{2}$$

wherein X equals the percent of acrylonitrile in the polymer molecule, the sum of the polymerized components equaling 100 percent.

Acrylonitrile has the formula $CH_2{=}CH{-}CN$ and when polymerized a polymer is obtained having the repeating unit

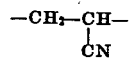

The nitrile grouping (—CN) has strong secondary bonding forces and may cause crystallization along a polymer chain. Such crystallizing groups favor more permanent molecular orientation of a polymer upon cold drawing. In polyacrylonitrile, the periodicity of the repeating nitrile group is exceptionally high since there is one nitrile group for each two carbon atoms in the linear chain.

When acrylonitrile is copolymerized with certain vinyl or vinylidene monomers, e. g. the acrylic esters, the itaconic esters, the vinyl ethers, the resulting copolymers are more soluble and have less tendency to retain molecular orientation. This increased solubility indicates lateral disorder along the polymer chain. There is also a loss in bonding strength which may be responsible for the relaxation of cold drawn structures as is generally evident when less than 85 percent of acrylonitrile is combined in these copolymers.

It has now been found that, if the monomers which are copolymerized with acrylonitrile have groups with high bonding strengths, the useful range of acrylonitrile copolymers is greatly extended, and that copolymers of acrylonitrile containing less than about 85 percent acrylonitrile may also be used in the production of satisfactory cold drawn oriented compositions. It is extremely surprising that even small quantities of fumaronitrile are exceptionally effective in this respect.

Fumaronitrile has the formula

and if polymerized, its polymers should have the repeating unit

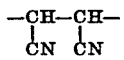

According to the present state of knowledge it has not been possible to polymerize fumaronitrile by itself. However, it may be copolymerized in some cases with other polymerizable materials such as acrylonitrile. This reluctance of fumaronitrile to polymerize is also evidenced somewhat by the fact that, up to the present time, it has not been possible to prepare simple copolymers of fumaronitrile and acrylonitrile containing in the polymer molecule a higher molecular ratio than 1 to 1 of fumaronitrile to acrylonitrile, which is equivalent to about 60 percent by weight fumaronitrile and 40 percent acrylonitrile.

These copolymers of acrylonitrile and fumaronitrile have polymer molecules containing repeating units of the following formulas

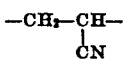

and

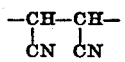

Tripolymers and other copolymers of acrylonitrile and fumaronitrile which contain additional copolymerizable compounds in the polymer molecule will also have other repeating units. These units will correspond to the units derived from polymerization or copolymerization of these third components or mixtures of components, such as from methyl beta-cyanoacrylate, beta-cyanoacrylamide, itaconamide, acrylic acid, methacrylic acid, methacrylonitrile, vinyl chloride, vinylidene chloride, vinyl chloracetate, styrene, monochlorostyrene, dichlorostyrene and itaconic acid.

This invention will be more fully described by the following examples, although it is understood that the invention is not intended to be limited by these examples. These examples illustrate the use of fumaronitrile to enhance the physical and chemical properties of acrylonitrile polymers. In these examples "parts" of materials is intended to mean parts by weight.

*Example I*

A copolymer was prepared by polymerizing a mixture of 80 parts acrylonitrile and 20 parts fumaronitrile under the following conditions: The mixed monomers were slowly added over a period of less than an hour to 750–1000 parts of distilled water at 30–50° C. containing dissolved therein 0.6 to 1 part of ammonium persulfate and 0.6 to 1.5 parts of sodium bisulfite. The reaction was continued for 1–3 hours, at which time a yield of over 80 percent solid copolymer was precipitated. Analysis of the resulting copolymer showed 94.2 percent acrylonitrile and 5.8 percent fumaronitrile in the polymer molecule and the molecular weight was found to be over 10,000. This copolymer showed no melting or softening point, and is insoluble in acetone, dioxane, nitromethane, ethyl acetate, methyl alcohol, butyl acetate, cyclohexanone, etc. It is soluble, however, in N,N-dimethyl acetamide and such a solution may be used in casting films and spinning fibers as indicated in Example II.

A series of copolymers having molecular weights of at least about 10,000 may be made similarly from various mixtures of acrylonitrile and fumaronitrile, which copolymers contain about 40 or more percent by weight of acrylonitrile and about 1 or more percent of fumaronitrile in the polymer molecule. By such copolymerization the highest combined ratio of the monomers may be one molecule of fumaronitrile per molecule of acrylonitrile, in which case the weight ratio is a maximum of about 60 parts fumaronitrile to about 40 parts of acrylonitrile in the polymer molecules. The polymers in this series show no melting or softening point, and all are insoluble in acetone, dioxane, nitromethane, ethyl acetate, methyl alcohol, butyl acetate, cyclohexanone, etc.

*Example II*

The following data illustrates the effective use of small quantities of fumaronitrile in modifying acrylonitrile polymers to produce molecularly oriented compositions with enhanced physical chemical properties. Films were cast from (a) a N,N-dimethyl acetamide solution of polyacrylonitrile, and (b) a N,N-dimethyl acetamide solution of the copolymer described in Example I containing 94.2 percent acrylonitrile and 5.8 percent fumaronitrile in the polymer molecule. Both polymers had been prepared under identical conditions. The films were dried to eliminate substantially all of the dimethyl acetamide solvent and thereafter cold drawn about 600 percent at 150–160° C. The cold drawn films were heat treated at constant length for 1 hour at 150° C. These heat treated films were then subjected to shrinkage tests in boiling water. The polyacrylonitrile film was found to shrink 3 percent whereas the copolymer film containing the small quantity of fumaronitrile had a shrinkage of only 1.5 percent. These results show that the polyacrylonitrile film had a shrinkage value of 100 percent more than that of the copolymer of this example. The drawn and heat treated copolymer film also exhibited birefringence under Nicol prisms.

Fibers may be spun from these same solutions of (a) and (b) to show the same improvement in resistance to shrinkage of the fumaronitrile copolymer fiber as compared to the polyacrylonitrile fiber.

*Example III*

A tripolymer containing in the polymer molecule 95 percent acrylonitrile, 2 percent fumaronitrile and 3 percent methacrylonitrile may be prepared by the procedure of Example I. This tripolymer may be dissolved in N,N-dimethyl acetamide and a film cast from the resulting composition. As in Example II, the tripolymer films and fibers when dried, cold drawn about 600 percent at 150–160° C., heat treated at constant length for 1 hour at 150° C., and then subjected to shrinkage tests in boiling water, show improved shrinkage resistance in comparison with polyacrylonitrile films and fibers.

The use of fumaronitrile in the practice of this invention also permits wide modification of the basic acrylonitrile copolymers with third monomers. The unmodified copolymers extend through a range of about 40 to 99 percent by weight acrylonitrile, and about 1 to 60 percent fumaronitrile. Thus in copolymers containing greater than about 80 percent acrylonitrile, a copolymer may have the following composition: about 80-99 percent acrylonitrile, about 1-20 percent fumaronitrile, and about 0-19 percent of other copolymerizable monomers. Also, in a tripolymer containing about 85 percent or more of acrylonitrile, the range of composition may be about 85-99 percent for acrylonitrile, about 1-15 percent for fumaronitrile and about 0-14 percent for other copolymerizable monomers.

In general, copolymers of acrylonitrile, fumaronitrile, and other copolymerizable monoethylenic compounds may have a percent range of other copolymerizable monoethylenic compounds in the polymer molecule varying from $$0 \text{ to } \frac{115-X}{2}$$

wherein X is the weight percent of acrylonitrile in the polymer. The amount of other copolymerizable compounds which is permissible without serious detraction from the molecular orientation properties obtained by this invention depends to a considerable extent on the bonding properties exhibited by the groups in these monomers. For example, large percentages are permissible for compounds containing groups of high bonding strengths as compared to low percentages permissible for compounds having groups of low bonding strengths. It may be possible, in some cases, therefore, to use amounts of compounds having high bonding strength, such as methacrylonitrile, the methyl ester of beta-cyanoacrylic acid, beta-cyanoacrylamide, itaconamide, etc., exceeding the amount represented by the above formula. However, when these copolymerizable compounds have low bonding strengths the amounts are preferably within the range of this formula.

When the third compound in an acrylonitrile-fumaronitrile tripolymer is one likely to exert small or no bonding forces, the amount of fumaronitile used to replace acrylonitrile in a polymerization composition must necessarily be larger than in cases when the third compound contributes greater bonding forces. For example, for a tripolymer containing about 65 percent acrylonitrile and a third compound of practically no bonding strength, in order to maintain the bonding strength desired to give the molecularly oriented compositions of this invention, the amount of fumaronitrile in the polymer molecule should be at least about 10 percent. This is not intended to imply that the only purpose of the fumaronitrile is to supply equivalent numbers of cyano groups since other benefits may be derived, such as improved heat resistance, than would be obtainable from the equivalent amount of acrylonitrile.

In a tripolymer which contains about 75 percent acrylonitrile and a third compound of low bonding strength, the polymer molecule should also contain at least about 5 percent fumaronitrile. In the case of tripolymers containing about 80 percent acrylonitrile, at least about 1 percent fumaronitrile may be sufficient. When the third compound contributes little or no bonding forces and about 1 percent fumaronitrile is used, it may be advantageous to increase the content of acrylonitrile to about 90 percent, and particular advantages may often be obtained with about 95 percent acrylonitrile. The character of the third compound is important in determining the amount of acrylonitrile to be used as the base monomer, the amount of fumaronitrile to be added as a modifier and the amount of third compound to give the desired special properties. For example, tripolymers having desirable properties may be made containing in the polymer molecule at least about 80 percent acrylonitrile, at least about 1 percent fumaronitrile and about 5 percent itaconic acid. Another useful composition for a tripolymer comprises about 25 percent vinyl chloride with at least about 65 percent acrylonitrile and at least about 1 percent fumaronitrile.

The third monomer or mixture of monomers may be selected from a large number of polymerizable monoethylenic compounds, for example, acrylic acid, methacrylic acid, methacrylonitrile, vinyl chloride, vinylidene chloride, vinyl chloroacetate, styrene, monochlorostyrene, dichlorostyrene, the methyl ester of beta-cyanoacrylic acid, beta-cyanoacrylamide, itaconic acid, itaconamide, etc. For economic reasons, it is preferred to use copolymers containing at least about 50 percent, or better, about 75 percent acrylonitrile. Examples of a number of suitable tripolymers comprising acrylonitrile, fumaronitrile and a third monomer are given below in percents by weight.

| Acrylonitrile | Fumaronitrile | Third Monomer |
|---|---|---|
| 90 | 5 | 5 Methacrylonitrile |
| 95 | 2 | 3 Itaconic acid |
| 90 | 5 | 5 Itaconic acid |
| 80 | 2 | 18 Vinyl chloride |
| 75 | 5 | 20 Vinylidene chloride |
| 70 | 6 | 24 Vinylidene chloride |
| 70 | 15 | 15 Methyl beta-cyanoacrylate |
| 65 | 5 | 30 Beta-cyanoacrylamide |
| 70 | 5 | 25 Itaconamide |
| 93 | 5 | 2 Acrylic acid |
| 92 | 5 | 3 Methacrylic acid |
| 95 | 2 | 3 Vinyl chloracetate |
| 90 | 5 | 5 Styrene |
| 85 | 5 | 10 Monochlorostyrene |
| 80 | 5 | 15 Dichlorostyrene |

The copolymers of this invention may be prepared by any suitable method, for example, by mass polymerization, emulsion polymerization, etc. It may be advantageous to add various ingredients to the polymerizable mass such as catalysts, emulsifying agents, solvents, etc. Various materials may be also incorporated in the copolymers. For example, palsticizers, lubricants, pigments, etc. may be added either to the polymerizable mass or the copolymers to give special properties to the resultant product.

For use in the preparation of shaped articles, the copolymers of this invention have molecular weights preferably of at least about 10,000. However, copolymers of molecular weights less than 10,000 may be used for other purposes, such as impregnants, solvent resistant coatings, etc. The molecular weight of the copolymers is dependent on the concentrations of monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphus or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Since the bonding strength in acrylonitrile polymers is due to the —CN groups, the copolymers of acrylonitrile and fumaronitrile may exhibit possibly as much as 150 percent of the bonding strength exhibited in polyacrylonitrile as a standard. It is surprising therefore, that certain solvents such as N,N-dimethyl acetamide and a number of other compounds containing the —CNS, HCON<, —CON(CH₃)₂ groups, etc., may be used to prepare compositions of these copolymers, from which compositions may be prepared molecularly oriented shaped articles, e. g. fibers, exhibiting characteristic X-ray diffraction patterns along the fiber axis. The formation of these oriented structures is more surprising when it is considered that fumaronitrile does not polymerize by itself yet when polymerized as in the practice of this invention, it produces compositions which may be molecularly oriented.

Instead of using N,N-dimethyl acetamide as a solvent in the practice of this invention, dimethyl formamide or a number of other solvents may be used, alone or in conjunction with N,N-dimethyl cyanamide; N,N-dimethyl cyanoacetamide; N,N-dimethyl methoxyacetamide; methylene dinitrile; methylene di-thiocyanate; formylcaprolactam,

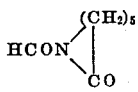

formyl morpholine,

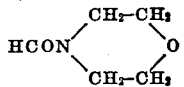

tetramethylene sulfone, etc.

Useful fibers may be made from the solutions of the copolymers of this invention by dry spinning, as in the preparation of cellulose acetate fibers, or by wet spinning, as in the preparation of viscose rayon. In wet spinning, the solution of copolymer may be spun into a substance which is a non-solvent for the copolymer, but which is advantageously compatible with the solvent in which the polymer is dissolved. For example, water, acetone, methyl alcohol, carbon disulfide, glycerine, chloroform, carbon tetrachloride, benzene, etc., may be used as a precipitating bath for N,N-dimethyl acetamide and other solvent compositions of these copolymers. The extruded fiber, from which substantially all of the solvent has been removed in the spinning step, 1–10 percent remaining in the shaped article, may then be cold drawn about 100–600 percent, and the drawn fiber heat treated, usually at substantially constant length, at about 150–160° C. to effect further crystallization and removal of the remaining solvent. The term "heat treated," as used herein, refers to the application of heat to an object, usually at a controlled temperature and usually by means of the medium surrounding the object.

As discussed before, the molecularly oriented fibers and other structures of this invention may be identified by their X-ray diffraction patterns which are distinct and characteristic. These structures are also characterized by their low shrinkage in boiling water, which shrinkage is generally under 3 percent of the cold drawn or stretched article, and preferably under 2 percent.

The fibers prepared by the practice of this invention are especially advantageous because of their improved resistance to shrinkage, good heat resistance and tensile strength. Moreover, these properties make the fibers desirable for use in the manufacture of hosiery and for such all-purpose fabrics as are used for blouses, shirts, suits, etc.

I claim:

1. A copolymer of acrylonitrile and fumarodinitrile, said copolymer containing in the polymer molecule at least about 40 percent by weight acrylonitrile, at least about 1 percent fumarodinitrile, and at least about 1 percent of monoethylenic compound of the class consisting of methyl beta - cyanoacrylate, beta - cyanoacrylamide, itaconamide, acrylic acid, methacrylic acid, methacrylonitrile, vinyl chloride, vinylidene chloride, vinyl chloracetate, styrene, monochlorostyrene, dichlorostyrene and itaconic acid, the sum of the copolymerized compounds equalling 100 percent.

2. A fiber comprising a copolymer of acrylonitrile and fumarodinitrile, said copolymer having a molecular weight of at least about 10,000 and containing in the polymer molecule at least about 40 percent by weight acrylonitrile and at least about 1 percent fumarodinitrile.

3. A fiber comprising a copolymer of acrylonitrile and fumarodinitrile, said copolymer having a molecular weight of at least about 10,000 and containing in the polymer molecule at least about 40 percent by weight acrylonitrile, at least about 1 percent fumarodinitrile and the percent of another polymerizable monoethylenic compound contained in the polymer molecule varying $$\text{up to } \frac{115-X}{2}$$

wherein X equals the percent of acrylonitrile in the polymer molecule, the sum of the copolymerized compounds equaling 100 percent.

4. A cold drawn fiber having molecular orientation, said article comprising the polymerization product of a polymerizable mass containing acrylonitrile and fumarodinitrile, and said polymerization product having a molecular weight of at least about 10,000 and containing in the polymer molecule at least about 40 percent by weight acrylonitrile and at least about 1 percent fumarodinitrile.

5. A cold drawn fiber having molecular orientation, said fiber comprising a copolymer of acrylonitrile and fumarodinitrile, said copolymer having a molecular weight of at least about 10,000 and containing in the polymer molecule at least about 40 percent by weight acrylonitrile, at least about 1 percent fumarodinitrile, and the percent of another copolymerizable monoethylenic compound contained in the polymer molecule varying $$\text{up to } \frac{115-X}{2}$$

wherein X equals the percent of acrylonitrile in the polymer molecule, the sum of the copolymerized compounds equaling 100 percent.

6. A cold drawn fiber having molecular orientation, which fiber comprises a copolymer containing in the polymer molecule at least about 80 percent acrylonitrile and at least about 1 percent fumarodinitrile, said copolymer having a molecular weight of at least about 10,000.

7. A cold drawn fiber having molecular orientation, which fiber comprises a copolymer containing in the polymer molecule at least about 90 percent acrylonitrile and at least about 1 percent fumarodinitrile, said copolymer having a molecular weight of at least about 10,000.

8. A cold drawn fiber having molecular orientation, which fiber comprises a copolymer containing in the polymer molecule at least about 80 percent acrylonitrile, at least about 1 percent fumarodinitrile, and at least about 1 percent of a copolymerizable monoethylenic compound of the class consisting of methyl beta-cyanoacrylate, beta-cyanoacrylamide, itaconamide, acrylic acid, methacrylic acid methacrylonitrile, vinyl chloride, vinylidene chloride, vinyl chloracetate, styrene, monochlorostyrene, dichlorostyrene and itaconic acid, said copolymer having a molecular weight of at least about 10,000.

9. A cold drawn fiber having molecular orientation, which fiber comprises a tripolymer containing in the polymer molecule at least about 90 percent acrylonitrile, at least about 1 percent fumarodinitrile, and about 5 percent itaconic acid, said tripolymer having a molecular weight of at least about 10,000.

10. A cold drawn fiber having molecular orientation, which fiber comprises a tripolymer containing in the polymer molecule at least about 65 percent acrylonitrile, at least about 1 percent fumarodinitrile, and about 25 percent vinyl chloride, said tripolymer having a molecular weight of at least about 10,000.

GAETANO F. D'ALELIO.

REFERENCES CITED

The following references are of record in the file of this patent:

UNITED STATES PATENTS

| Number | Name | Date |
| --- | --- | --- |
| 2,245,310 | Waterman | June 10, 1941 |
| 2,366,495 | D'Alelio | Jan. 2, 1945 |
| 2,404,713 | Houtz | July 23, 1946 |
| 2,404,723 | Merner | July 23, 1946 |